United States Patent [19]

Witschi

[11] Patent Number: 5,643,418
[45] Date of Patent: Jul. 1, 1997

[54] METHOD OF AND ARRANGEMENT FOR SEPARATING FLUID MIXTURES

[76] Inventor: William A. Witschi, HCR 1699, Benson, Ariz. 85602

[21] Appl. No.: 338,327

[22] Filed: Nov. 14, 1994

[51] Int. Cl.$^6$ ............................................. B01D 3/00
[52] U.S. Cl. .................. 202/182; 95/266; 96/189; 96/193; 196/111; 159/DIG. 16; 159/DIG. 31; 202/197; 202/185.1; 202/202; 202/205; 210/188
[58] Field of Search ............................ 202/205, 197, 202/202, 182, 185.1; 4/209 R, 211, 218; 196/111; 159/43.1, DIG. 16, DIG. 31, DIG. 17; 95/266; 96/189, 193; 203/10, 11, DIG. 5, 40; 210/188, 180

[56] References Cited

U.S. PATENT DOCUMENTS

| | | | |
|---|---|---|---|
| 1,966,791 | 7/1934 | Fowler et al. | 183/2.5 |
| 3,136,834 | 6/1964 | Lorenz | 266/34 |
| 3,642,583 | 2/1972 | Greenberg et al. | 203/DIG. 5 |
| 3,853,513 | 12/1974 | Carson | 55/185 |
| 3,873,283 | 3/1975 | Hamblin | 55/185 |
| 3,966,559 | 6/1976 | Athanassiadis | 210/180 |
| 4,044,406 | 8/1977 | Hargraves | 210/220 |
| 4,078,723 | 3/1978 | Hunt | 237/63 |
| 4,094,789 | 6/1978 | Kemper | 210/188 |
| 4,172,791 | 10/1979 | Davister | 210/188 |
| 4,256,837 | 3/1981 | Fluri et al. | 210/188 |
| 4,371,382 | 2/1983 | Ross | 159/49 |
| 4,385,909 | 5/1983 | Starr | 210/188 |
| 4,419,109 | 12/1983 | Matula | 55/192 |
| 4,668,252 | 5/1987 | Gerdau | 55/191 |
| 5,043,061 | 8/1991 | Inagaki | 159/DIG. 28 |
| 5,207,869 | 5/1993 | Harmoning et al. | 203/DIG. 5 |

*Primary Examiner*—Virginia Manoharan
*Attorney, Agent, or Firm*—Antonio R. Durando

[57] ABSTRACT

A device for intercepting liquid obtained from a stream of mixed fluids contains an enclosure having an upper opening and a lower opening. The upper opening is connectible to a source of suction while the lower opening is connectible to a source of the mixed fluids. A partition between the openings divides the enclosure into a liquid collecting section which includes the upper opening and a liquid discharging section which includes the lower opening. The partition has a liquid flow passage at the lower end thereof and an orifice at the upper end thereof, and the orifice provides a pressure drop between the two openings. A liquid collecting basin is formed at the bottom of the enclosure, and the lower opening is provided with an overflow for the basin. In operation, the suction source draws a stream of mixed fluids from the mixed fluid source. Liquid is derived from the stream in or above the liquid collecting section and forms a pool in the liquid collecting basin. When the pool covers the liquid flow passage, the pressure drop between the liquid collecting section and the liquid discharging section causes the liquid level in the liquid discharging section to decrease and the liquid level in the liquid collecting section to increase. The drop in level within the liquid discharging section prevents the backflow of liquid to the mixed fluid source while the suction source operates.

5 Claims, 1 Drawing Sheet

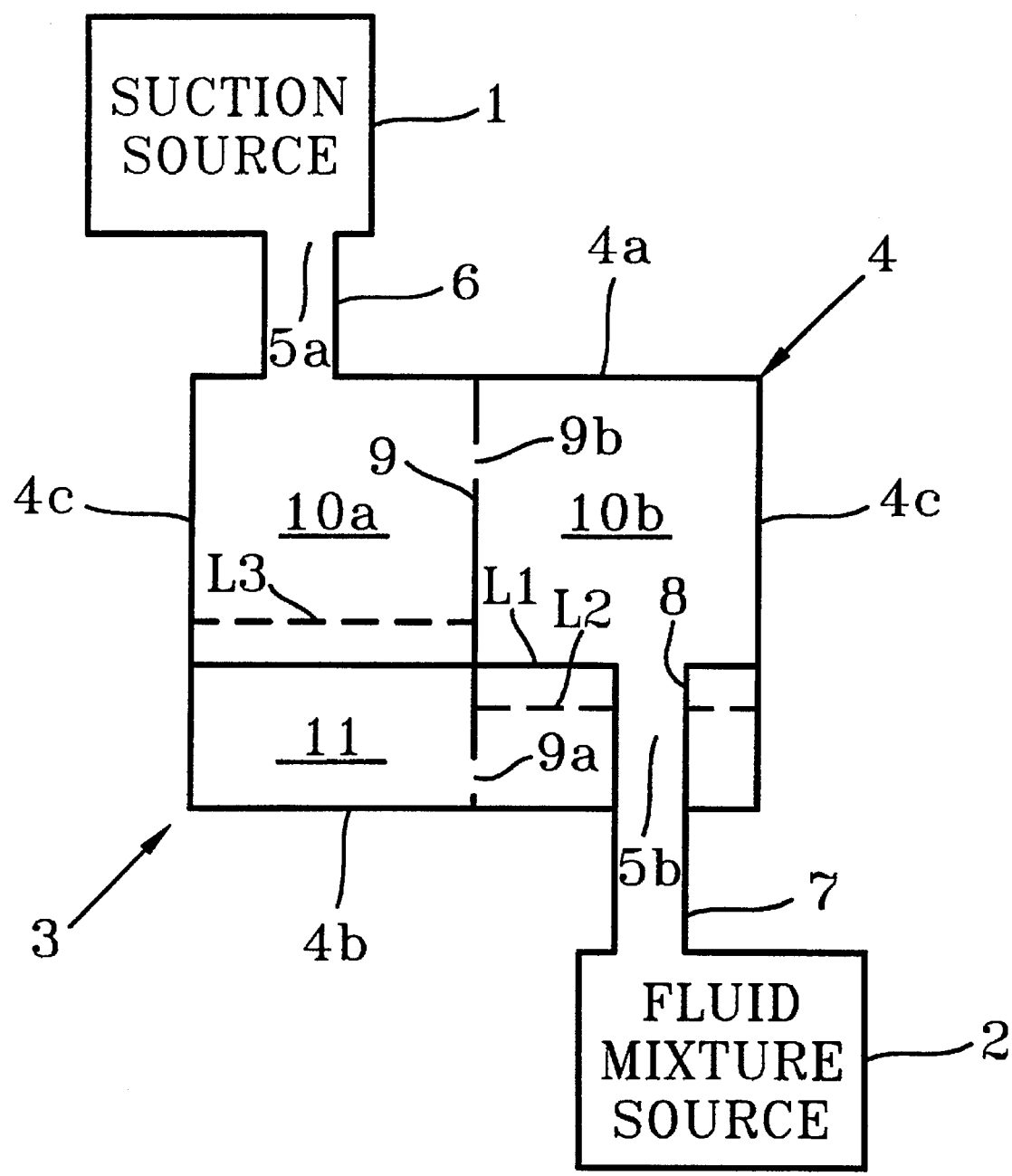

5,643,418

METHOD OF AND ARRANGEMENT FOR SEPARATING FLUID MIXTURES

BACKGROUND OF THE INVENTION

1. Field of the Invention

The invention relates to the separation of mixtures containing fluids which condense at different temperatures.

2. Description of the Prior Art

A known system for venting water-closet bowls includes a fan which is mounted at a level higher than that of the bowl. A vent pipe having a vertical section establishes communication between the fan and the bowl. The pipe opens to the bowl at a level above that of the water in the bowl so that the fan can withdraw odor-laden air from the bowl. The fan generally operates only while the water closet is in use.

Due to the water in the bowl, the air withdrawn from the bowl contains large amounts of moisture and may be nearly saturated. This moisture condenses in the pipe and flows back towards the bowl interfering with the air flow and creating annoying sounds. Hence, it would be desirable to have a system which can separate a mixture such as air and water while at least temporarily preventing backflow of liquid to a source of the mixture.

Various systems and devices for handling mixtures of this type are known. Thus, U.S. Pat. No. 1,966,791 shows a system in which water and free air from a vacuum heating circuit are discharged into an air and water separator. The water flows to a deaerator where it passes over one or more trays while being contacted with steam. From the deaerator, the water flows into a storage chamber having an outlet pipe at the bottom thereof. The outlet pipe is connected to a pump which feeds the water to an apparatus where the water is to be stored or utilized. The upper end of the storage chamber communicates with a condenser, and air liberated in the deaerator flows into the condenser to permit condensation of water vapor in the air. An overflow is also provided at the upper end of the storage chamber to limit the height of the water level in the chamber. The storage chamber may be eliminated and the deaerator directly connected to the feed pump.

U.S. Pat. No. 3,136,834 describes an apparatus for degassing molten metal. The apparatus comprises a vacuum chamber having intake and return conduits which are partly immersed in a molten metal bath. In operation, gas is blown into the lower portion of the intake conduit and carries the molten metal in the intake conduit into the vacuum chamber where it is degassed. The degassed molten metal flows back to the bath via the return conduit. To prevent molten metal from being carried too far up in the vacuum chamber, a deflecting plate is mounted in the vacuum chamber above the intake conduit.

U.S. Pat. No. 3,853,513 illustrates a vapor-liquid separation apparatus. The apparatus includes a vessel having an inlet for a mixed stream of foam, vapor and liquid, and two outlets for vapor and liquid, respectively. The liquid outlet is covered by a perforated cap which stabilizes the flow of liquid out of the vessel. The inlet is connected to a curved nozzle which subjects the incoming stream to a centrifugal action in order to aid in the separation of liquid from foam and vapor. The liquid falls into a bath which is maintained in the lower part of the vessel. Apertured vertical baffles are located in this part of the vessel to reduce vortices in the bath. The upper part of the vessel accommodates a vapor conduit which is perforated to break down foam, and a demister is mounted at the upper end of the vapor conduit. The vapor conduit cooperates with two plates to define a space for the curved inlet nozzle.

U.S. Pat. No. 3,873,283 again teaches a vapor-liquid separation apparatus. The apparatus comprises a vessel having an inlet for a mixed stream of foam, vapor and liquid, and two outlets for vapor and liquid, respectively. The inlet communicates with a T-shaped distributor which splits the incoming stream into two portions and discharges each portion tangentially to the inner surface of the vessel. A series of trays is mounted in the vessel, and the trays are connected to one another by downcomers. Foam barriers are located above the uppermost tray while distributors are disposed on this tray to reduce churning. A horizontal plate with a weir edge is positioned beneath the down-comer of the lowermost tray. The plate intercepts the liquid discharged from the lowermost tray and decreases the tendency of this liquid to disturb the bath which forms below the trays. A vapor conduit passes through the trays and is bounded at the top by a demister. The vapor conduit is perforated in the areas between the trays to break down foam.

U.S. Pat. No. 4,078,723 shows a device for removing gas from mixtures of gas and liquid. The device consists of a hollow cylindrical body which is closed at either end by a flat plate and is provided with a vent. One of the plates is formed with a cold inlet feed while the other plate is formed with a flow inlet and a return outlet. The device is designed to be connected in a heating system to prevent air build-up.

U.S. Pat. No. 4,419,109 discloses a device for degassing paper pulp stock. The device is made up of an elongated tank having a pulp inlet at one end and two pulp outlets at the other end. A series of vertical tubes is mounted in the inlet, and the tubes are connected to a feed pipe which distributes incoming pulp among the tubes. Pulp discharged from the tubes travels towards the pulp outlets which are separated by an overflow. The outlet on the near side of the overflow leads to a papermaking machine while the outlet on the far side of the overflow leads back to the feed pipe.

U.S. Pat. No. 4,668,252 illustrates a degasifier for a liquid which has been separated from a gas. The degasifier comprises an upright cylindrical vessel having a gas outlet at its upper end and a liquid outlet at its lower end. The degasifier further comprises a coarse separation section and a fine separation section which function to separate the gaseous and liquid components of a gas-liquid mixture from one another. A distributor in the form of a baffle plate can be provided between the separation sections. The fine separation section is made up of a filter cartridge which surrounds the gas outlet and is closed at the bottom by a baffle plate. The coarse separation section may be constituted by the baffle plate or by the walls of a tubular vessel which is in communication with the cylindrical vessel. In operation, the liquid separated from a gas-liquid mixture forms a pool at the bottom of the cylindrical vessel or a container connected to the liquid outlet of the cylindrical vessel. A gas space is created in the cylindrical vessel or the container and, in the cylindrical vessel, may be formed within a cup-like member mounted upside-down immediately above the liquid outlet. A gas pipe leads from the gas space to a feed pipe which directs gas-liquid mixtures into the cylindrical vessel. The discharge end of the gas pipe communicates with the interior of the feed pipe, and a constriction is formed in the feed pipe at or near the discharge end of the gas pipe. The constriction creates a pressure drop that causes gas to be sucked out of the gas space.

The systems and devices described above are relatively complex and expensive. Moreover, none of these systems is intended for the venting of water-closet bowls. Therefore, there remains a need for a simple device that can be used to trap moisture carried by a water-closet exhaust system.

BRIEF SUMMARY OF THE INVENTION

It is an object of the invention to provide relatively simple means which enables fluids having different condensation temperatures to undergo at least partial separation while liquid backflow to a source of the fluids is temporarily avoided.

Another object of the invention is to provide relatively economical means which makes it possible to at least temporarily prevent liquid backflow to a source of fluids having different condensation temperatures when the fluids are at least partially separated.

An additional object of the invention is to provide relatively uncomplicated and inexpensive means which can temporarily eliminate liquid backflow to an area being vented and containing fluids having different condensation temperatures.

A further object of the invention is to provide a relatively simple method which permits fluids having different condensation temperatures to undergo at least partial separation while liquid backflow to a source of the fluids is temporarily avoided.

It is also an object of the invention to provide a relatively economical method which makes it possible to at least temporarily prevent liquid backflow to a source of fluids having different condensation temperatures when the fluids are at least partially separated.

Still another object of the invention is to provide a relatively uncomplicated and inexpensive method which can temporarily eliminate liquid backflow to an area being vented and containing fluids having different condensation temperatures.

A final object of the invention is to provide the aforementioned means and method in a device that contains no moving parts.

The preceding objects, as well as others which will become apparent as the description proceeds, are achieved by the invention.

One aspect of the invention resides in a device for use where a mixture containing two fluids with different condensation temperatures is at least partially separated. The device comprises a compartment having a first opening and a second opening, and the first opening constitutes an outlet for one of the fluids while the second opening constitutes an outlet for the liquid phase of the other fluid. A partition is provided between the openings, and a liquid flow passage is defined in the region of one end of the partition while an orifice is defined between the passage and the opposite end of the partition. The orifice is provided to create a pressure differential between the two opposite sides of the partition.

The partition divides the compartment into two sections which are in communication via the flow passage and the orifice. The section with the first opening can serve as a collecting section for the liquid phase of one component of a fluid mixture while the second section can serve as a discharging section for the liquid. The flow passage allows the liquid in the collecting section to flow into the discharging section so that the liquid in the two sections can form a single pool.

When the flow passage is covered by the pool of liquid and a mixture flows through the orifice from the discharging section into the collecting section, a pressure drop occurs across the partition. Due to the resulting pressure differential between the discharging section and the collecting section, the liquid level in the discharging section decreases while the liquid level in the collecting section increases correspondingly. By designing the discharging section so that liquid is unable to enter the outlet opening of the discharging section unless the liquid has a predetermined level, it becomes possible to prevent the backflow of liquid for a certain length of time in a simple and economical manner.

The outlet opening of the collecting section can be connected to a source of suction and the outlet opening of the discharging section to a source of a fluid mixture. The mixture is then drawn into the discharging section via the opening used for the discharge of liquid and through the orifice into the collecting section. The mixture, or at least one component of the mixture, is thereafter drawn through the outlet opening of the collecting section towards the suction source. If the mixture contains two gases which are to be at least partially separated by condensation of a portion of one of the gases, a condensing section can be provided between the collecting section and the suction source.

By way of example, the outlet opening of the collecting section can be connected to an exhaust fan and the outlet opening of the discharging section to the air space in a water-closet bowl. The exhaust fan draws a mixture of odor-laden air and water vapor from the bowl. The water vapor, or at least a portion thereof, can be condensed by providing a cold section of pipe between the fan and the outlet opening of the collecting section. Water condensed from the mixture can enter the collecting section by gravity via the opening through which the mixture leaves this section.

Another aspect of the invention resides in a method for use where a mixture containing two fluids with different condensation temperatures is at least partially separated. The method comprises the steps of forming a pool from the liquid phase of one of the fluids, and lowering the level of a first part of the pool while raising the level of a second part of the pool in response to the lowering step.

The forming step can include the operations of at least partially condensing one of the fluids, and collecting the condensate. The lowering step may involve establishing a pressure differential between the first and second parts of the pool. Such a pressure differential can be established using downstream suction or, equivalently, upstream pressure.

The method can further comprise the steps of decreasing the level of the second pool part while increasing the level of the first pool part in response to the decreasing step, and discharging liquid from the pool in response to the increase in level of the first pool part.

BRIEF DESCRIPTION OF THE DRAWING

Additional features and advantages of the invention will become apparent from the following detailed description of preferred embodiments when read in conjunction with the accompanying drawing.

The sole FIGURE schematically illustrates a venting system in which a mixture containing two fluids with different condensation temperatures is at least partially separated utilizing a device in accordance with the invention.

DESCRIPTION OF THE PREFERRED EMBODIMENT

The sole FIGURE illustrates in schematic form a venting system having a suction or vacuum source 1 which draws a fluid mixture from an object 2 to be vented. The mixture contains two fluids having different condensation temperatures, and the object 2 can be considered to constitute a source of the mixture.

For the purpose of description, the object 2 is assumed to be a water-closet bowl and the suction source 1 is assumed to be an exhaust fan mounted at a level above the bowl 2. The fluid mixture drawn from the bowl 2 consists essentially of air and water vapor. The water vapor is derived from the water which is normally present in the water-closet bowl 2.

The exhaust fan 1 is generally off while the water-closet bowl 2 is not in use and is switched on by a person preparing to use the bowl 2. This person will usually switch off the exhaust fan 1 after using the water closet. Thus, the exhaust fan 1 normally operates intermittently for relatively short periods.

In a conventional system, the exhaust fan 1 is connected to the bowl 2 by a pipe or other conduit having a relatively long rising section. The pipe may be below the condensation temperature of the water vapor in the air/water-vapor mixture withdrawn from the bowl 2. If that is the case, some water vapor will condense on the interior walls of the pipe and the water obtained upon condensation will flow back towards the bowl 2 and interfere with the normal mixture flow.

In accordance with the invention, a water intercepting device or trap 3 is inserted between the exhaust fan 1 and the bowl 2. The intercepting device functions to prevent the backflow of water to the bowl 2 during operation of the exhaust fan 1, at least if the exhaust fan 1 is not run for an excessively long period of time.

The intercepting device 3 includes an enclosure or container 4 having, for example, a horizontal top wall 4a, a horizontal bottom wall 4b and vertical side walls 4c (the front and back walls are not shown in the figure) which define a compartment or chamber. The enclosure 4 is provided with an upper opening 5a and a lower opening 5b which are spaced laterally of the enclosure 4. Thus, the upper opening 5a is located on the left-hand side of the enclosure 4 in the top wall 4a whereas the lower opening 5b is located on the right-hand side of the enclosure 4 in the bottom wall 4b. The lower opening 5b constitutes an inlet opening for the air/water-vapor mixture drawn from the bowl 2 and an outlet opening for water condensed from the mixture. In contrast, the upper opening 5a constitutes an outlet opening for the air/water-vapor mixture and an inlet opening for condensed water.

The upper opening 5a is connected to the exhaust fan 1 by a pipe or conduit 6. At least a portion of the pipe 6 is sufficiently cold to cause condensation of water vapor contained in the air/water-vapor mixture withdrawn from the bowl 2, and such portion of the pipe 6 constitutes a condensing section.

The lower opening 5b of the enclosure 4 is connected to the bowl by a pipe or conduit 7. The pipe 7, either directly or indirectly, opens to the interior of the bowl 2 above the normal water level in the bowl 2.

A pipe section or tubular segment 8 projects upward from the lower opening 5b into the compartment of the enclosure 4. The pipe section 8 extends to a level L1 of the compartment and, together with the bottom wall 4b and side walls 4c of the enclosure 4, defines a water collecting basin at the bottom of the compartment. The upper end of the pipe section 8 constitutes an overflow for condensed water which collects in the basin. The pipe section 8, which can be integral with or separate from the pipe 7, can be considered to constitute an extension of the pipe 7.

A vertical partition or wall 9 extends from top to bottom, and across the width, of the compartment in the enclosure 4. The partition 9 is located between the openings 5a and 5b and divides the compartment into a water collecting section 10a and a water discharging section 10b. A water flow passage 9a is formed in the lower end of the partition 9 while an orifice 9b is formed in the upper end of the partition 9. The orifice 9b functions to provide a pressure drop between the discharging section 10b and the collecting section 10a when fluid flows through the orifice 9b. Except for the water flow passage 9a and the orifice 9b, the partition 9 is imperforate. The level L1 of the upper end of the pipe section 8 is between the flow passage 9a and the orifice 9b.

The operation of the illustrated venting system will be described assuming no liquid is initially present in the enclosure 4. When the exhaust fan 1 is energized, a mixture of air and water vapor is continuously withdrawn from the bowl 2 and travels through the pipe 7 and the pipe section 8 into the water discharging section 10b of the enclosure 4. The air/water-vapor mixture passes through the water flow passage 9a and the orifice 9b into the water collecting section 10a of the enclosure 4 and thereupon enters the pipe 6 via the upper opening 5a of the enclosure 4.

In the pipe 6, at least a portion of the water vapor in the mixture condenses to water which flows back into the water collecting section 10a. The water accumulates at the bottom of the enclosure 4 to form a pool 11. The pool 11 is initially confined to that portion of the water collecting basin of the enclosure 4 which is located in the water collecting section 10a. Once the pool 11 reaches the level of the water flow passage 9a, the pool 11 spills over into the portion of the water collecting basin which is located in the water discharging section 10b.

As mentioned previously, the exhaust fan 1 is generally switched off when the water-closet is not being used. Thus, it may take several uses before the liquid pool 11 rises to the level of the water flow passage 9a.

Eventually, the pool 11 reaches a level higher than that of the water flow passage 9a. When this occurs, the air/water-vapor mixture drawn from the bowl 2 can no longer pass through the water flow passage 9a and all of the mixture must now flow through the orifice 9b. In response to the vacuum induced by the fan 1, a pressure differential between the sections 10a and 10b is created by the restriction to fluid flow provided by the orifice 9b. Consequently, while the exhaust fan 1 is on, the pressure in the water collecting section 10a of the enclosure 4 is less than that in the water discharging section 10b. A quantity of water related to the pressure differential thus flows from the water discharging section 10b into the water collecting section 10a. The level of the part of the pool 11 in the water discharging section 10b is accordingly lowered whereas the level of the part of the pool 11 in the water collecting section 10a is raised. The levels equalize when the exhaust fan 1 is switched off and the pressures in the water collecting section 10a and water discharging section 10b are equalized via the orifice 9b.

After the water-closet system has been used for a sufficient period of time, the pool 11 reaches the level L1 of the upper end of the pipe section 8. Until this occurs, none of the water condensed from the air/water-vapor mixture returns to the bowl 2.

When the pool 11 is at the level L1 of the upper end of the pipe section 8 and the exhaust fan 1 is switched on, the pressure drop created by the restriction to the air/water-vapor mixture flow through the orifice 9b causes the part of the pool 11 in the water discharging section 10b to be lowered to the level L2. The part of the pool in the water collecting section 10a correspondingly rises to the level L3.

As one skilled in the art readily understands, addition of water to the collecting section 10a from pipe 6 causes levels L2 and L3 to rise equally but maintain a relative height difference determined by the pressure differential between sections 10a and 10b. Due to the fact that the level L2 of the part of the pool 11 in the water discharging section 10b is below the overflow level L1, water added to the pool by further condensation of water vapor from the air/water-vapor mixture does not cause the pool to overflow while the system is in use unless the fan 1 is energized for a period of time sufficient to add enough water to the pool to cause level L2 to reach the overflow level L1. Hence, unless the bowl 2 is used for an excessively long time, no water returns to the bowl 2 while the system is in use.

Once the exhaust fan 1 is switched off, the pressures in the water collecting section 10a and the water discharging section 10b equalize and the level of the part of the pool 11 in the water collecting section 10a begins to drop. At the same time, the part of the pool 11 in the water discharging section 10b rises to the overflow level L1.

It will be recalled that the pool 11 was at the overflow level L1 prior to the last use of the water-closet system so that the amount of water in the pool 11 was just enough to fill the water collecting basin at the bottom of the enclosure 4. Inasmuch as water was added to the pool 11 during the last use of the system, the volume of the pool 11 now exceeds the capacity of the water collecting basin when the fan 1 is not energized. Accordingly, water from the pool 11 is discharged into the pipe section 8 and returns to the bowl 2 via the pipe 7. The discharge of water from the pool 11 stops when the volume of the pool 11 again equals the capacity of the water collecting basin. The pool 11 is then once more at the overflow level L1.

The water intercepting device 3 makes it possible to simply and effectively eliminate the backflow of water to the bowl 2 while the latter is being used. The device 3 has a relatively simple construction and can be manufactured relatively inexpensively. Furthermore, the device 3 is quite reliable due to the fact that it operates on a simple natural principle and has no moving parts. Obviously, the collecting capacity of the device 3 can be expanded at will by increasing the surface of liquid pool 11 or, to some extent, by increasing the pressure differential between the collecting and discharging sections.

Various modifications can be made within the meaning and range of equivalence of the appended claims. For instance, the invention is applicable not only to gaseous mixtures but to mixtures of gas and liquid as well.

I claim:

1. A device for use where a mixture containing two fluids with different condensation temperatures is at least partially separated, said device comprising a compartment having a first opening and a second opening, said first opening constituting an outlet for one of the fluids, and said second opening constituting an outlet for the liquid phase of the other of the fluids; and a partition between said openings, said partition having opposite ends, and said partition defining a liquid flow passage in a region of one of said ends and an orifice between said passage and the other of said ends, said orifice being provided to create a pressure drop between said openings, said compartment including a basin for accommodating a pool of liquid, and said compartment being provided with an overflow for liquid which collects in said basin, said compartment further including at least one wall which constitutes a bottom of said basin, and said one wall being located in the region, of said one end, said overflow being located at a level between said passage and said orifice, said compartment additionally including another wall, which constitutes a top of said compartment.

2. The device of claim 1, wherein said orifice is located in the region of said other end.

3. A system for use where a mixture containing two fluids with different condensation temperatures is at least partially separated, said system comprising means for generating a flow of said two fluids; and means for establishing a flow path for said two fluids which communicates with a source of the mixture, said establishing means including a compartment having a first opening and a second opening, and connecting means for connecting said second opening to the source of the mixture, said compartment being provided with a partition between said openings, and said partition having opposite ends, said partition defining a liquid flow passage in the region of one of said ends and an orifice between said passage and the other of said ends, said orifice being provided to create a pressure drop between said openings, said compartment including a basin for accommodating a pool of liquid, and said compartment being provided with an overflow for liquid which collects in said basin, said compartment further including at least one wall which constitutes a bottom of said basin, and said one wall being located in the region of said one end, said overflow being located at a level between said passage and said orifice, said compartment additionally including another wall which constitutes a top of said compartment.

4. The system of claim 3, further comprising additional connecting means for connecting said first opening to said generating means; and wherein said additional connecting means comprises means for at least partially condensing one of the fluids.

5. The system of claim 3, wherein said orifice is located in the region of said other end.

* * * * *